United States Patent
Tjøm

(10) Patent No.: US 11,953,321 B2
(45) Date of Patent: Apr. 9, 2024

(54) METHOD FOR ESTABLISHING A CONSOLIDATED WATER CURRENT VELOCITY PROFILE

(71) Applicant: IDROP AS, Lysaker (NO)

(72) Inventor: Kyrre J. Tjøm, Blommenholm (NO)

(73) Assignee: IDROP AS, Lysaker (NO)

(*) Notice: Subject to any disclaimer, the term of this patent is extended or adjusted under 35 U.S.C. 154(b) by 437 days.

(21) Appl. No.: 17/428,891

(22) PCT Filed: Jan. 29, 2020

(86) PCT No.: PCT/NO2020/050018
§ 371 (c)(1),
(2) Date: Aug. 5, 2021

(87) PCT Pub. No.: WO2020/162759
PCT Pub. Date: Aug. 13, 2020

(65) Prior Publication Data
US 2022/0074742 A1 Mar. 10, 2022

(30) Foreign Application Priority Data
Feb. 7, 2019 (NO) .................................... 20190166

(51) Int. Cl.
*G01C 13/00* (2006.01)
*B63B 79/15* (2020.01)
(Continued)

(52) U.S. Cl.
CPC ............ *G01C 13/002* (2013.01); *B63B 79/15* (2020.01); *B63G 8/001* (2013.01); *B63G 8/20* (2013.01);
(Continued)

(58) Field of Classification Search
CPC .... G01C 13/002; G01C 21/20; G01C 13/006; B63B 79/15; B63B 2211/02; B63G 8/001;
(Continued)

(56) References Cited

U.S. PATENT DOCUMENTS 3,738,164 A 6/1973 Dreyer
4,258,568 A * 3/1981 Boetes .................... B63B 22/18
367/133
(Continued)

FOREIGN PATENT DOCUMENTS

| CN | 209492668 | 10/2019 |
| WO | 2011106237 | 9/2011 |
| WO | 2013169115 | 11/2013 |

OTHER PUBLICATIONS

Medagoda et al. (Autonomous Underwater Vehicle Localization in a Spatiotemporally Varying Water Current Field, IEEE, 2015) (Year: 2015).*

(Continued)

*Primary Examiner* — Mohammad K Islam
(74) *Attorney, Agent, or Firm* — Jeffrey S. Melcher; Melcher Patent Law PLLC

(57) ABSTRACT

The invention relates to a method for determining a water current velocity profile in a water column by registration of a deviation between a first position and a second position of an underwater vehicle travelling in the water column. A batch of underwater vehicles is deployed from a surface vessel into the water. The vehicle(s) steers to the first position, which for the first batch is a predefined estimated position (PEP). The vehicle is by first means recording the second position, which is the actual position (AP). The difference ΔP between the predefined estimated position PEP and the actual position is registered and based on the
(Continued)

difference a deviation data set is calculated. An updated current profile or stack of horizontal water current velocities UV is determined.

9 Claims, 4 Drawing Sheets

(51) Int. Cl.
| | |
|---|---|
| *B63G 8/00* | (2006.01) |
| *B63G 8/20* | (2006.01) |
| *G01C 21/20* | (2006.01) |
| *G05D 1/00* | (2006.01) |
| *G05D 1/04* | (2006.01) |
| *G05D 1/10* | (2006.01) |

(52) U.S. Cl.
CPC .............. *G01C 21/20* (2013.01); *G05D 1/048* (2013.01); *G05D 1/10* (2013.01); *B63G 2008/002* (2013.01)

(58) Field of Classification Search
CPC .... B63G 8/20; B63G 2008/002; G05D 1/048; G05D 1/10; G05D 1/0692; G01V 1/3843; G01V 1/38; G01V 1/3817; G01V 1/3835; G01V 1/3852
See application file for complete search history.

(56) References Cited

U.S. PATENT DOCUMENTS

| | | | | |
|---|---|---|---|---|
| 6,820,008 | B1* | 11/2004 | van Smirren | G01S 15/58 367/90 |
| 2006/0256653 | A1* | 11/2006 | Toennessen | G01V 1/3826 367/16 |
| 2009/0122640 | A1* | 5/2009 | Hill | G01V 1/3808 702/14 |
| 2010/0185348 | A1 | 7/2010 | Webb | |
| 2013/0258806 | A1 | 10/2013 | Siliqi | |
| 2014/0177387 | A1 | 6/2014 | Brizard | |
| 2017/0254914 | A1 | 9/2017 | Poole | |
| 2019/0155310 | A1* | 5/2019 | Kim | G05D 1/048 |
| 2020/0110189 | A1* | 4/2020 | Fyffe | B63G 8/001 |

OTHER PUBLICATIONS

Medagoda (Mid-water Localisation for Autonomous Underwater Vehicles, 2012) (Year: 2012).*
International Search Report Issued in PCT/NO2020/050018, dated Apr. 17, 2020, pp. 1-4.
Written Opinion Issued in PCT/NO2020/050018, dated Apr. 17, 2020, pp. 1-4.

* cited by examiner

METHOD FOR ESTABLISHING A CONSOLIDATED WATER CURRENT VELOCITY PROFILE

The present invention relates to a method for determining a water current velocity profile in a water column by registration of a deviation between a first position and a second position of an underwater vehicle travelling in the water column, said method comprising deploying a batch of underwater vehicles—comprising at least one vehicle—from a surface vessel into the water, said vehicle steering to the first position which for the first batch is a predefined estimated position (PEP) calculated by a first predefined water current velocity profile.

In the marine environment, seismic data has conventionally been collected by towing long streamers of receivers and energy sources (typically acoustic energy) behind a surface vessel or a separate source vessel. During the past decade, independent ocean bottom receivers called 'seismic nodes' have been developed. Nodes record seismic data actively and continuously from the time, they are deployed on the seafloor.

In general, the seismic nodes are independent seismometers and are self-contained units. They comprise a housing, or a set of individual housings, that comprises various internal components such as geophone, hydrophone sensors, a recorder, a memory for storing the seismic data, a clock for time synchronization, and a power source.

While a cable, wire or rope connecting the seismic nodes determines the inline distance between seismic nodes, it does not ensure that the seismic nodes are deployed along a predetermined path. Further, when a plurality of seismic nodes attached to a cable is deployed in the sea, it is required to know the position of the cable and the positions of the seismic nodes during and after deployment.

The standard Nodes can either be deployed by an Remotely Operated Vehicles (ROVs) operated from a surface vessel, or by attaching the seismic nodes to a cable or a rope or a wire. Many other towing members are deployed from a vessel. These vessels may be configured to monitor the deployment of a plurality of seismic nodes. Further, the sensor data provides a current profile.

Current meter measurement equipment is today costly to purchase and expensive to install and operate for longer profiles measurements, i.e. in deeper waters, the sensor beam-pattern frequency is low and equipment physically heavier and voluminously larger. Measurement accuracy and resolution is dependent on environmental condition, such as weather (waves and wind), pressure-, temperature-, oxygen- and salt ratio, and installation quality.

Alternatively, cumbersome installation on the seafloor, fixed with the sensor-beam facing upwards, or mechanically integrated on the ship hull or on a through-hull sensor pole extending downwards is used.

Acoustic Doppler current profilers (ADCP) are types of sonar that attempt to produce a record of water current velocities, and direction, over a range of depths. The most popular acoustic Doppler current profilers use a scheme of four transducers. They produce mono-frequency sound pulses traveling through the water in four different, but known directions. If the acoustic Doppler current profiler is looking down into the water, each transducer would be aligned at 12, 3, 6 and 9 o'clock positions facing away from the perimeter of the clock. These are tilted down 90 degrees in elevation below the horizon. As chatters in the water return the echo of the sound, it is shifted in frequency due to the Doppler Effect. In addition to the transducers, the acoustic Doppler current profiler typically has a receiver, an amplifier, a clock, a temperature sensor, a compass, a pitch-and-roll sensor, analog-to-digital converters, memory, digital signal processors and an instruction set. The analog-to-digital converters and digital signal processors are used to sample the returning signal, determine the Doppler shift, and sample the compass and other sensors. Trigonometry, averaging and assumptions are used to calculate the horizontal velocity of the group of echoing scatters in a volume of water. By repetitive sampling of the return echo, and by "gating" the return data in time, the acoustic Doppler current profiler can produce a profile of the water currents over a range of depths.

The main disadvantage of the ADCPs is the loss of data close to the boundary. This mechanism, often referred to as a side lobe interference, covers 6-12% of the water column and, for instruments looking up toward the surface, the loss of velocity information close to the surface is real disadvantage. Cost is also a concern.

Further, the ADCP contributes to noise pollution in the ocean, which may interfere with acoustic navigation and acoustic ranging.

A static alternative is a costly "real-time" sensor, with an extensive complementary sensor portfolio, mounted on an autonomous- or remotely controlled vehicle (DVL). For underwater vehicles, the bottom-tracking feature can be used as an important component in the navigation systems. In this case, the velocity of the vehicle is combined with an initial position fix, compass or gyro heading, and data from the acceleration sensor. The sensor suite is combined (typically by use of a Kalman filter) to estimate the position of the vehicle. This helps to navigate submarines, autonomous and remotely operated underwater vehicles. However, this is only a local effect and benefit.

Therefore, it is desirable to be able to determine the full water current profile more precise, and thereby making it possible to navigate and positioning a multiple of subsea units—such as vehicles and nodes—in a reliable and accurate manner thereby increasing the effectiveness in the global positioning of underwater nodes and minimizing the cost for this. Especially the horizontal water current profile is important to determine as the vertical seems steadier or limited and therefor reliably predictable.

The present invention seeks generally to improve the estimated water current profile such that the abovementioned insufficiencies and drawbacks of today's methods and systems are overcome or at least it provides a useful alternative.

Up to this day, prior art has failed to teach a simple and yet reliable and inexpensive method for determining a water current profile which in a safe and reliable manner, without substantially increasing the cost is able to satisfy the above-mentioned much desired characteristics.

According to the invention, a method is provided, as per the introductory part of this specification, and wherein the vehicle by first means is recording the second position, which is the actual position AP, and the difference $\Delta P$ between the predefined estimated position PEP and the actual position is registered, and based on said difference a deviation data set is calculated, and an updated horizontal water current velocity UV is determined in said water column.

The current profile could initially be a neutral current setting, i.e. velocity=0 at all levels in the water column.

During a normal operation, numerous vehicles—a batch—are dropped simultaneously or at short intervals.

They autonomously steer laterally, away from the surface vessel vertical, based on a predefined hydrodynamic model/digital twin corrected for real-time inertia measurements, compass and pressure, towards a predefined location on the seafloor.

During the flight, the vehicle position is acoustically measured in semi real-time, and a consolidated data set of the deviation from the estimated positions—versus the measured position—is relayed acoustically to a surface and a PC or mainframe. These individually measured deviations, is collectively used as a dataset for post-measurement processing, establishing a complete water current profile.

The method utilize existing hardware and logged data and requires only a topside CPU-capacity, and data storage, incl. a software patch for calculating a complete- and high resolution water current profile. This high-resolution water current profile is based on the most resent estimated/predefined current profile and an actual water current velocity profile, which is used for defining the next estimated water current profile used for autonomous flight control and navigation.

The water current profile is instantly available for the next batch of vehicles or underwater applications such as nodes.

The concept can also be used on an inter-chained node deployment system, i.e. nodes attached to a wire, rope or cable, pre-requisite the capacity to individually acoustically communicate bi-directionally.

Basically, this "high-resolution" current profile is obtained for free, without the need for new hardware and—expensive installation and maintenance. In addition, the support vessel does not require standing still to produce reliable measurements. The water current profile is used to better and more efficient deploy nodes accurately to the seafloor or on their return to surface. On a larger scale, this information may provide an improved 3D-model of the water-current profile over a large area in terms of both vertical and horizontal resolution: A sub-meter resolution vertical profile every 100-500 m in a horizontal grid pattern, (over a 1500 km$^2$-survey area). The better the estimated water current profile is the better the vehicles can be positioned on the seafloor and the better and more accurately the nodes can be deployed with reduced use of hydro acoustics ranging, and hence cheaper and faster.

In other words the vehicle deployed for different purpose such as lateral transporting different payloads are equipped with a device that records the actual position and the deviation between the current profile of the estimated path and the actual path is recorded and used for calculating a more precise estimated position for the next batch of vehicles. The new estimated current velocity profile is then used for deploying a new set of nodes more accurately. Typically, nine nodes are deployed each time comprising a full batch. Around three thousand nodes are deployed in order to record a full seismic survey grid. Therefore, it does not matter that the first series of nodes actually are deployed in a position that differs significantly from the intended and correct position as the feedback from these vehicles are making the subsequent positioning more and more precise.

By the method, a consolidated water current velocity profile is obtained.

According to one embodiment,
the updated water current velocity UV is sent to a controller,
said controller is updating the predefined estimated position PEP to an updated estimated position UEP based on the predefined estimated position PEP and the updated water current velocity, and the said next batch of vehicles dropped into the water are steering to the first position based on the updated estimated position UEP.

All nodes are calculating its unique trajectory to steer toward its pre-plot position.

According to one embodiment,
every new batch of vehicles travelling in the water after the first batch of vehicles is using the updated estimated position UEP calculated by the data set obtained by a batch of vehicles recently deployed, said this position now being the first position.

According to one embodiment,
the predefined estimated position PEP and the first position is based on a digital twin hydrodynamic model and information data obtained by measuring 6-axis changes in inclination, acceleration and direction, and at least one pressure sensor, recording pressure or water depth, and a compass for measuring the vehicle heading.

According to one embodiment,
the actual position AP is determined by an acoustic transducer carried by the vehicle in question said acoustic transducer is recording data in semi real time.

Deviation between the first position—whether this is PEP or UEP—and the AP will be recorded as means of measured ranges (LBLs—Long base line measurements) between the acoustic transducer placed on the vehicle in question, and reference transponders on the surface, and/or in combination with already installed vehicles on the seafloor—being post landing georeferenced relative to the support vessel and its GPS-equipment. The UV position could also be obtained with a USBL positioning system from the surface vessel.

The actual position AP is determined by acoustical position or range measurements and geometrical triangulation.

Already installed drop-nodes/vehicles on the seafloor will be positioned by the support vessel, and hence their positions globally referenced based on the vessels GPS-position and heading.

According to one embodiment,
a profile for the water current velocity deviation is depicted in a 3D model in vertical and horizontal direction thereby providing a grid pattern.

This improves the position of devices deployed on the seabed and makes a present, updated, and correct current profile available.

According to one embodiment,
the UV is calculated by a topside CPU-capacity such as a computer comprising a software patch, said UV is used for calculating an updated estimated position UEP as the first position.

Thereby an updated current profile is provided.

According to one embodiment,
a water current velocity deviation ΔD between the predefined estimated water velocity current profile and a calculated water velocity current profile is determined based on the data set.

According to one embodiment,
the first position and a first trajectory is determined by a data-set comprising a first water current data profile and the second position-and a second trajectory is determined by data-set comprising a second water current data profile.

According to one embodiment, each batch of underwater vehicles comprises the same number of vehicles preferably 9 vehicles all travelling through the water column towards the first position on the seafloor.

The invention is also related to use of the method according to the invention for determining an improved and precise position when deploying nodes, underwater vehicles and other devices into the water, and for determining a precise position of nodes, underwater vehicles and other devices already deployed in the water.

The invention will be explained with reference to FIG. 1.

Figure 1:
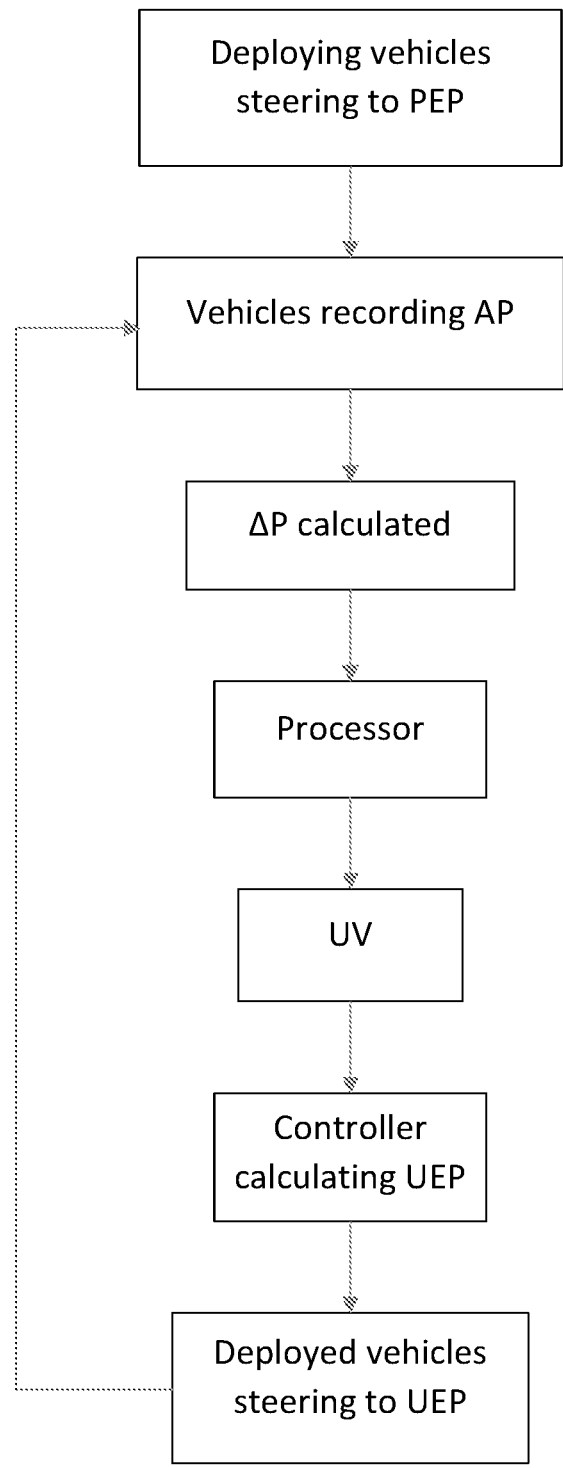
FIG. 1 is showing a flowchart of a method for navigating a batch of underwater vehicles to a more precise position.

FIG. 1 is showing a flowchart of a process for navigating a batch of underwater vehicles to a more precise position. A deviation ΔP is determined and used for determining a more precise position: an updated estimated position UEP—a first position—for the next batch of vehicles. The deviation between this first position and a second position ΔP is determined. The second position is an actual position AP of an underwater vehicle travelling in the water column. A batch of underwater vehicles—normally 9—is deployed from a surface vessel into the water. The vehicles are steering to the first position, which for the very first batch is a predefined estimated position PEP. This PEP is determined by an estimated water current velocity profile. The estimated water current velocity profile is based on a hydrodynamic model, and information data obtained by measuring 6-axis changes in inclination, acceleration and direction and at least one pressure sensor recording pressure and a compass.

Each vehicle is by first means such as an acoustic transducer recording the second position, which is the actual position AP.

The difference ΔP between the predefined estimated position PEP and the actual position ΔP is registered, and based on said difference a deviation data set is calculated. A water current velocity deviation ΔD between the predefined estimated water current velocity profile and a calculated water current velocity profile might also be determined.

The value of ΔP—and when appropriate ΔD—is sent to a topside controller, and the controller is updating the predefined estimated position PEP to an updated estimated position UEP based on the predefined estimated position PEP and the ΔP. The next batch of vehicles is dropped into the water and are steering to the first position based on the updated estimated position UEP. In this way the deviation between actual position AP and planned position UEP will be less and less for an increasing number of batches of vehicles deployed in the water.

Figure 2:
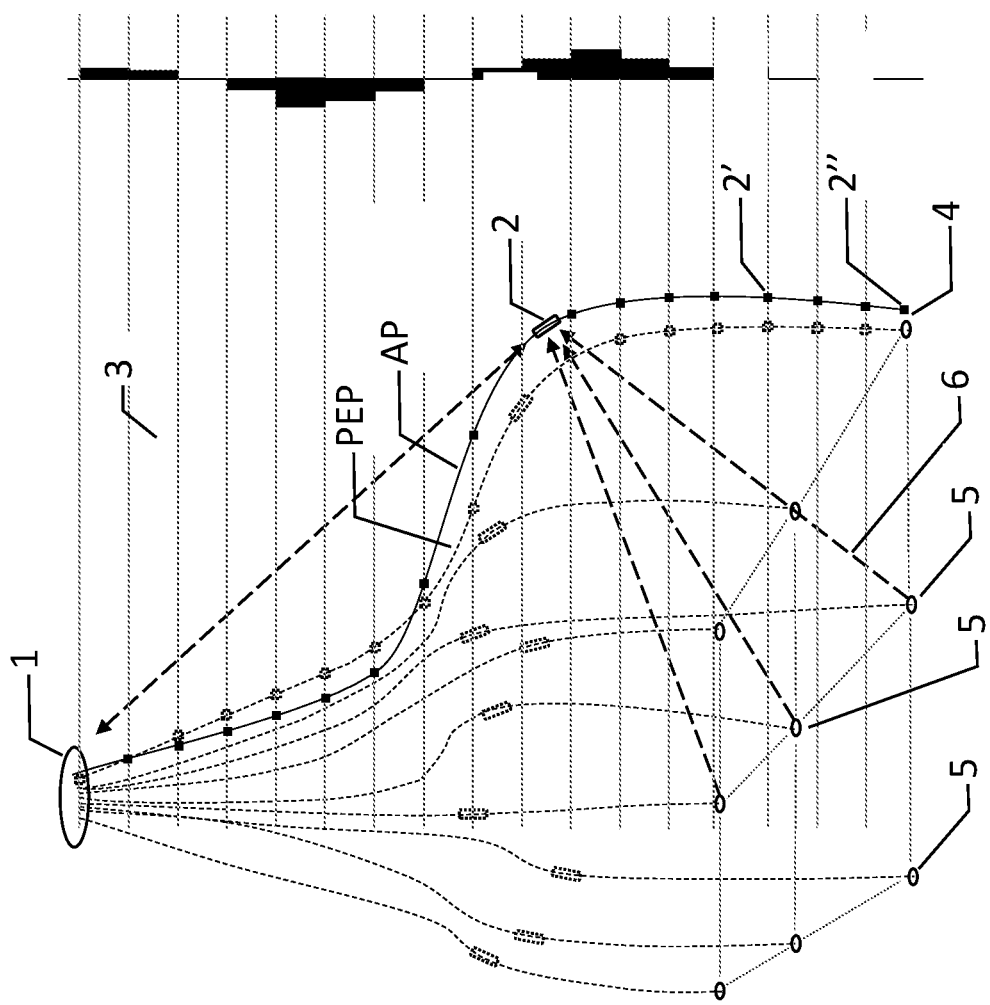
FIG. 2A is a sketch view of a vessel deploying a batch of underwater vehicles into the water.
FIG. 2B is a 2D view of a water current profile.

FIG. 2A is a sketch of a vessel 1 deploying underwater vehicles 2 into the water 3. The travelling of the vehicle through the water is shown by different positions of the same vehicle and marked 2, 2', 2". The end position 4 is where the vehicle 2" is placed. The AP is registered by using signals from a transducer and signals 6 from already deployed vehicles 5 placed on the seabed. These vehicles 5 are also sending signals back to the vessel 1. The predefined position PEP or predefined trajectory is shown with a dotted line. The actual position AP is offset in relation to PEP. The advantages are: less need for extensive acoustic ranging, date recording is up to date, there is less flow and it is more accurate. Further, the digital twin is used. FIG. 2B shows the current velocity profile in 2D that is the profile in horizontal direction for different depths. In reality, this profile will be a 3-D representation, taking compass heading of the current into consideration.

Figure 3:
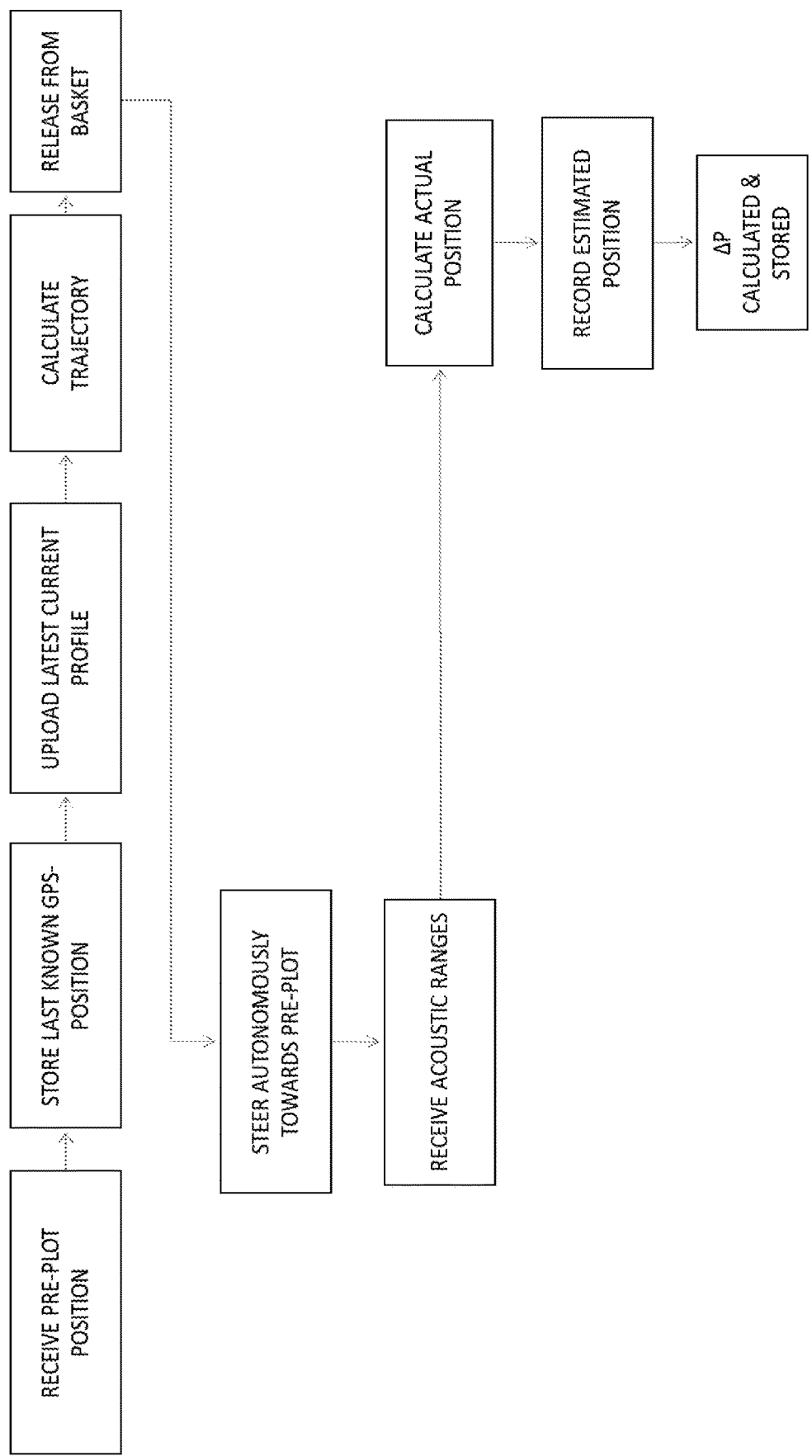
FIG. 3 is showing a flowchart of a method for navigating a batch of underwater vehicles to a more precise position.

FIG. 3 is showing flowchart of a method for navigating a batch of underwater vehicles to a more precise position. The flowchart also shows how acoustics ranges are used in order to calculate the actual position. A pre-plot position is received and the last-known GPS-position is also registered. The information is used to upload the latest current profile and calculate a trajectory. Then the vehicles are deployed and steering towards the pre plotted position. The actual position is determined based on acoustics information and the value of ΔP is now calculated and stored. This value is the used for the next batch of vehicles.

Figure 4:
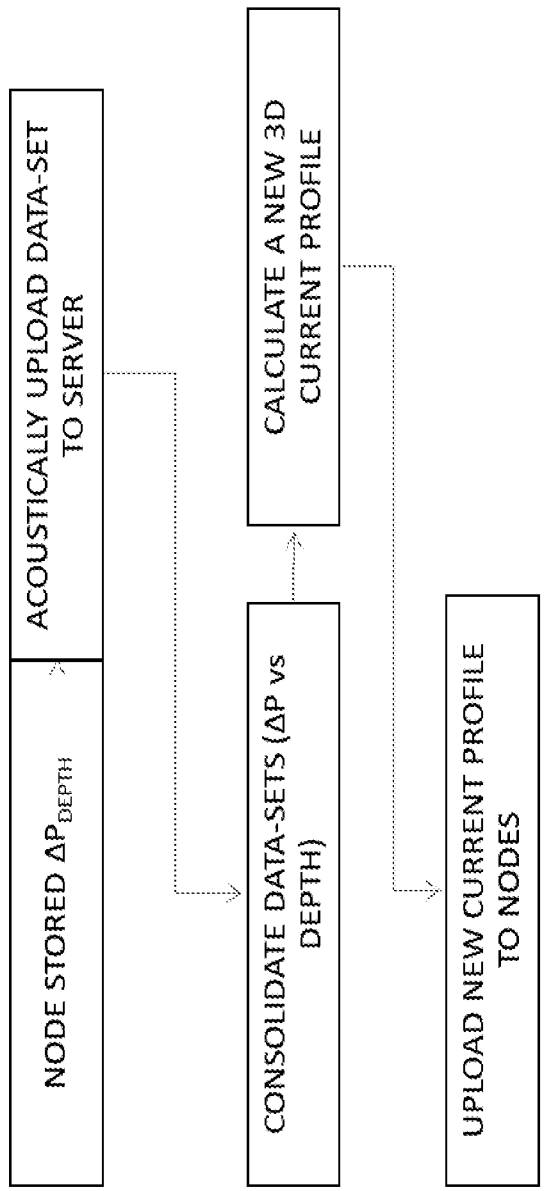
FIG. 4 is showing a flowchart of a method for providing a 3D picture of a water current profile provided by the method.

FIG. 4 is showing a flowchart of a method for providing a 3D picture of consolidated water current profiles provided by the method. ΔP is registered at certain depths for a number of vehicles and is used for calculating an updated 3D current profile topside. This 3-D current profile is then uploaded and used by nodes to be deployed later.

The invention claimed is:

1. A method for determining a water current velocity profile in a water column by registration of a deviation between a first position and a second position of an underwater vehicle travelling in the water column, said method comprising:

deploying a first batch of underwater vehicles comprising at least one vehicle from a surface vessel into the water, said at least one vehicle steering to the first position which for the first batch is a predefined estimated position (PEP) calculated by a first predefined water current velocity profile wherein the at least one vehicle by first means is recording the second position, which is the actual position (AP), the difference ΔP between the predefined estimated position PEP and the actual position (AP) is registered and based on said difference a deviation data set is calculated and an updated horizontal water current velocity UV is determined in said water column, the updated water current velocity UV is sent to a controller, said controller is updating the predefined estimated position PEP to an updated estimated position UEP based on the predefined estimated position PEP and the updated water current velocity UV, and a next batch of vehicles dropped into the water are steering to the first position based on the updated estimated position UEP.

2. The method according to claim 1, wherein every new batch of vehicles travelling in the water after the first batch of vehicles is using the updated estimated position UEP calculated by the data set obtained by a batch of vehicles recently deployed, said this position now being the first position.

3. The method according to claim 1, wherein the predefined estimated position PEP and the first position is based on a digital twin hydrodynamic model and information data obtained by measuring 6-axis changes in inclination, acceleration and direction and at least one pressure sensor recording pressure or water depth and a compass for measuring the at least one vehicle heading.

4. The method according to claim 1, wherein the actual position AP is determined by an acoustic transducer carried by the at least one vehicle, said acoustic transducer is recording data in semi real time.

5. The method according to claim 1, wherein a profile for the water current velocity deviation is depicted in a 3D model in vertical and horizontal direction thereby providing a grid pattern.

6. The method according to claim 1, wherein the updated horizontal current velocity profile UV is calculated by a topside CPU-capacity such as a computer comprising a software patch said UV is used for calculating the updated estimated position UEP as the first position.

7. The method according to claim 1, wherein a water current velocity deviation $\Delta D$ between the predefined estimated water velocity current profile and a calculated water velocity current profile is determined based on the data set.

8. The method according to claim 1, wherein the first position and a first trajectory is determined by a data set comprising a first water current data profile and the second position and a second trajectory is determined by dataset comprising a second water current data profile.

9. Use of the method according to claim 1, for determining an improved and precise position when deploying nodes, underwater vehicles and other devices into the water, and for determining a precise position of nodes, underwater vehicles and other devices already deployed in the water.

* * * * *